United States Patent [19]

Johnston

[11] Patent Number: 5,566,606
[45] Date of Patent: Oct. 22, 1996

[54] BARBECUE GRILL

[76] Inventor: Robert L. Johnston, 4448 Sims St., Columbus, Ga. 31907

[21] Appl. No.: 289,890

[22] Filed: Aug. 12, 1994

[51] Int. Cl.⁶ .............................. A47J 37/00; A47J 37/07
[52] U.S. Cl. ................. 99/446; 99/400; 99/444; 126/9 R; 126/25 R
[58] Field of Search ............................ 99/339, 340, 400, 99/401, 444–446, 447, 448, 450, 482, 481; 126/25 R, 9 R, 41 R, 9 A, 9 B

[56] References Cited

U.S. PATENT DOCUMENTS

| | | | |
|---|---|---|---|
| 3,500,812 | 3/1970 | Korngold | 126/25 R |
| 3,611,915 | 10/1971 | Glaser et al. | 99/445 |
| 3,714,937 | 2/1973 | Linstead | 126/25 R |
| 3,785,361 | 1/1974 | Mejyr et al. | 126/41 R |
| 4,094,295 | 6/1978 | Boswell et al. | 126/9 R |
| 4,353,347 | 10/1982 | Seed | 99/450 |
| 4,463,746 | 8/1984 | Knuth et al. | 126/9 R |
| 4,962,697 | 10/1990 | Farrar | 99/340 |
| 4,966,126 | 10/1990 | Wu | 99/446 |
| 5,076,154 | 12/1991 | Bagwell | 99/444 |
| 5,176,124 | 1/1993 | Wrasse | 126/25 R |
| 5,359,923 | 11/1994 | Boswell | 99/448 |

*Primary Examiner*—Timothy F. Simone
*Attorney, Agent, or Firm*—James W. Kayden; Hopkins & Thomas, L.L.P.

[57] ABSTRACT

A barbecue grill has a bottom casting formed with a flange portion along its periphery. The flange portion extends up at an angle between approximately thirty and forty-five degrees from a cooking grate so that grease produced while cooking may be directed into the bottom casting, through an aperture in the bottom casting, and into a grease collection cup. The grease collection cup is mounted to the bottom casting in a manner which permits the tilting of the cup relative to the bottom casting. The periphery of the bottom casting is formed with an upstanding tongue which is received within a groove formed in a hood of the barbecue grill. The groove defines an inner leg for directing grease into the grill and an outer leg for directing water away from the inside of the grill.

9 Claims, 3 Drawing Sheets

BARBECUE GRILL

BACKGROUND OF THE INVENTION

Gas fired barbecue grills have become increasingly popular as a means for outdoor cooking. These appliances have supplanted older style charcoal grills as a preferred method of outdoor cooking for a number of reasons. Gas barbecue grills are able to provide an almost instantaneous source heat as opposed to what is typically at least a thirty minute wait for charcoal grills to achieve a cooking temperature. Gas grills also burn clearer and thus alleviate some of the environmental and health concerns associated with charcoal grills.

The basic design for a gas barbecue grill includes a bottom casting or fire box which contains a burner element, a grate on which food is placed, disposed above the burner element, and in most cases a radiant material of some type. It is common for such appliances to be mounted on a wheeled cart and, in some cases, on a fixed post or stand which is secured to a deck or patio. While this basic design is relatively common throughout the industry, there are some attendant disadvantages. The evacuation of grease from gas grills is always a concern as grease accumulation can cause flare-ups, thus affecting cooking performance and also detracting from the condition and appearance of the grill. As gas barbecue grills are outdoor appliances, they are subjected to weather extremes. Since many of the burner parts and associated venturi tubes, gas conduit lines, etc. are made of steel, rust protection is also a concern. Of utmost importance, of course, is the cooking performance, which depends of many factors such as the type of burner, type of radiant, the casting design and other factors. It is to the overall improvement of cooking performance and the elimination of some of the disadvantages attendant in some prior art gas barbecue grills to which the present invention is directed.

SUMMARY OF THE INVENTION

It is, therefore, one of the principal objects of the present invention to provide a gas barbecue grill that provides superior cooking performance with an aesthetically pleasing outside and inside grill configuration, thereby enhancing and encouraging its use as a cooking appliance.

A further object of the present invention is to provide a novel grease evacuation system for a barbecue grill which works in combination to direct grease away from the cooking surface and the burner element.

A still further object of the present invention is to provide a novel grease collection cup and associated mounting which is easily removed and reinstalled and which allows the user to view the contents thereof.

An additional object of the present invention is to provide a barbecue grill which provides superior cooking performance and which is durable to provide a long service life.

These and other objects are attained by the present invention which relates to a gas barbecue grill having a top and bottom casting with a grease deflection means disposed therebetween to direct grease into the interior of the bottom casting and away from the burner element toward the grease collection cup means. The cooking grate of the present invention is recessed below the inwardly sloping outer perimeter portions of the bottom casting or fire box to both facilitate grease evacuation and the removal of food items from the cooking grate. The top casting includes a shield means which helps to protect the interior components from the weather.

Various additional objects and advantages of the present invention will become apparent in the following detailed description, when read in conjunction with the accompanying drawing figures.

DETAILED DESCRIPTION OF THE PREFERRED EMBODIMENT

Figure 1:
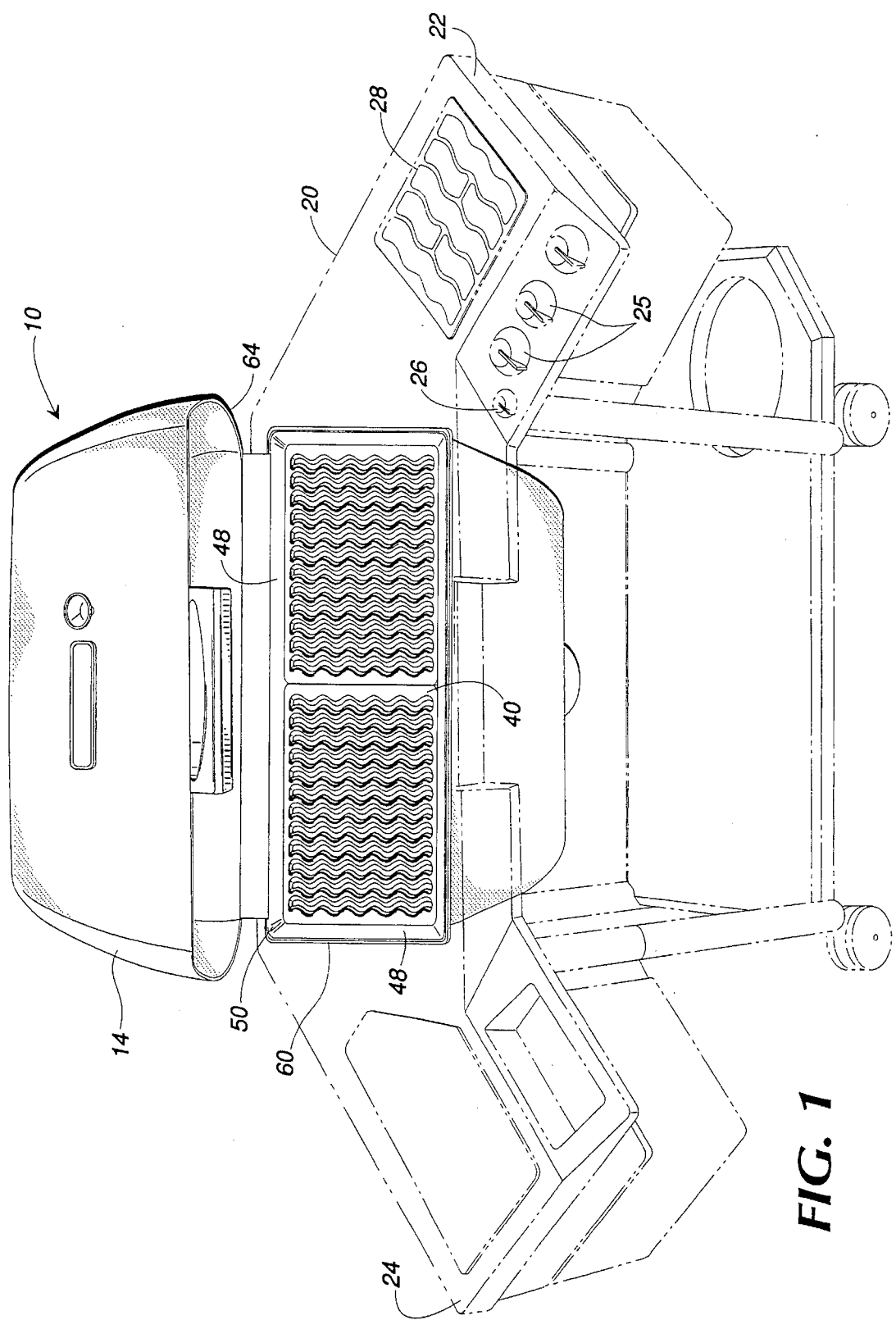
FIG. 1 is a perspective view of the present barbecue grill with a cart therefor shown in phantom lines.

Referring now more specifically to the drawings, and to FIG. 1 in particular, numeral 10 designates generally the present gas fired barbecue grill. The barbecue grill has a bottom casting 12 or fire box and a top casting or hood 14 disposed thereon. Within the bottom casting 12 is mounted a gas burner 16 and a shield 18 which prevents grease or other drippings from falling into the burner ports, this arrangement being shown in FIG. 2. Barbecue grills of this type are commonly mounted on a cart structure 20, shown in FIG. 1 in phantom lines. The particular cart structure shown in FIG. 1 includes side shelves 22 and 24. Situated on a portion of side shelf 22 are the controls 25 for the main gas burner 16 in the fire box; an igniter means 26 for lighting the burners; and a control 27 for controlling the side burner 28 which is situated on side shelf 22. The grill is fueled by LP gas from an LP gas tank (not shown) or from a natural gas line (not shown) that is run from the gas supply for the house or building where the grill is situated.

Figure 2:
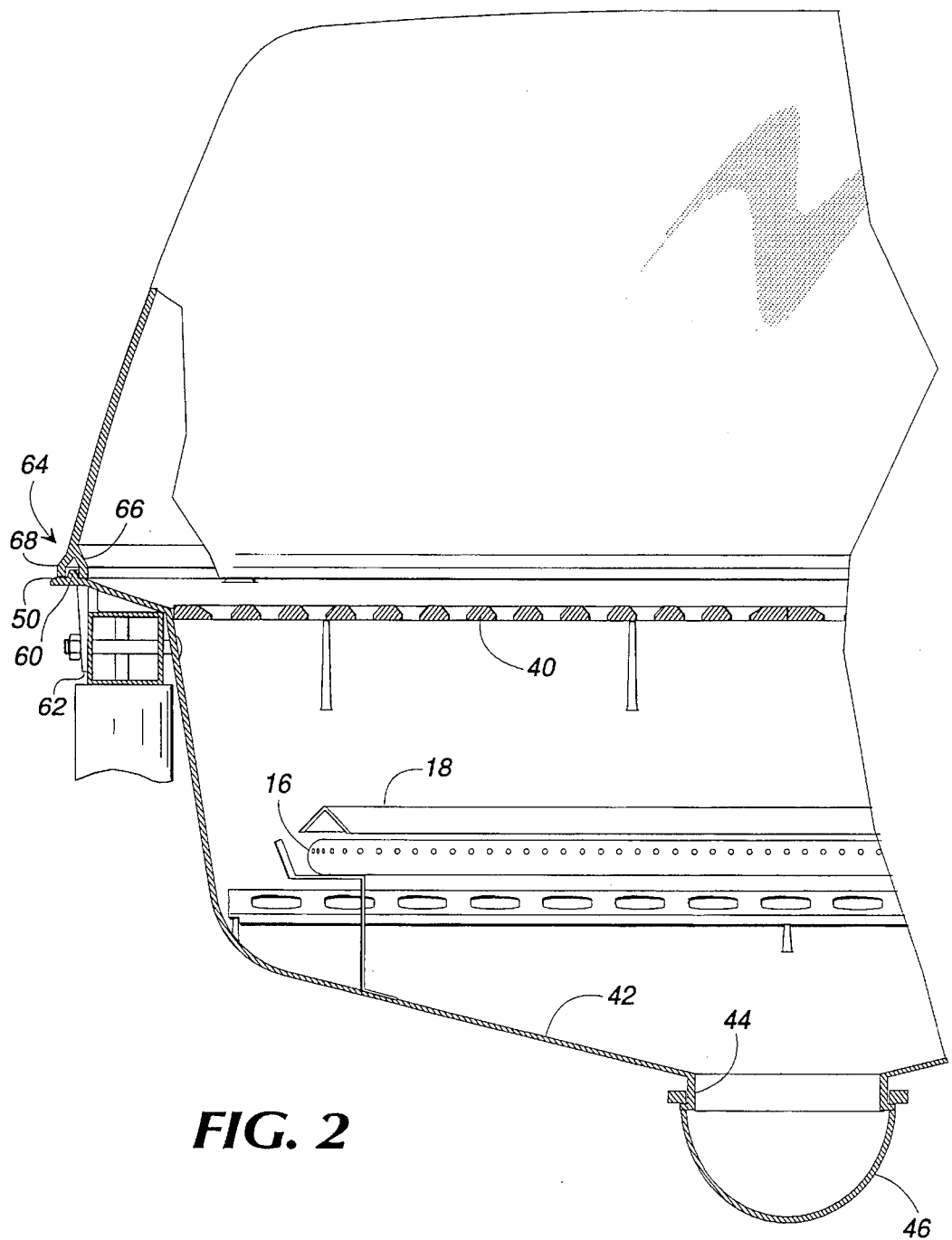
FIG. 2 is a partial cross sectional view illustrating the recessed grate mounting and the grease collection means.

Referring to FIGS. 1 and 2, it will be seen that the bottom casting or fire box is relatively deep so as to space the burner element 16 a substantial distance from the cooking grate 40. The bottom edges 42 of the fire box are angled downwardly toward a centrally located aperture 44 in the bottom casting. Disposed beneath opening 44 is a grease collector cup into which is directed grease from foods being cooked on the grill. The grease collector cup will be discussed in greater detail hereinbelow.

The bottom casting has an upper flange portion 48 which is sloped downwardly and inwardly at an angle between approximately 30° and 45° from the periphery 50 thereof. This directs any grease which contacts the sloping surface back into the grill. The angular flange 48 also makes it easier to pick up food items that are being cooked on the grill. The angle of the flange is sufficient to provide some resistance to movement of the food without the attendant disadvantages of some conventional barbecue grills which have an upright wall behind the cooking grate which is sometimes inadvertently brushed against or touched by the food when the food is being moved, turned, or taken off the grill.

FIGS. 1 and 2 also illustrate a further improvement embodied in the present invention. Around the outer edge 50 of the bottom casting of the barbecue grill is an upstanding tongue 60. This tongue extends above the flange 48 and extends around the entire front and side portions of the fire box and up to a point where hinges 62 are mounted at the rear of the fire box. For mating with this tongue, a corresponding groove 64 is provided around the lower peripheral edge of the top casting or hood 14. When the hood is in a closed position, the tongue is received within the groove. The groove extends downwardly and outwardly from both the inner and outer surfaces of the hood 14, as shown in FIG. 2. The groove thus has an inner leg 66 which is designed to direct grease downwardly into the fire box. The outer leg 68 is designed to deflect e.g., rain, outwardly away from the internal workings of the grill.

Figure 3:
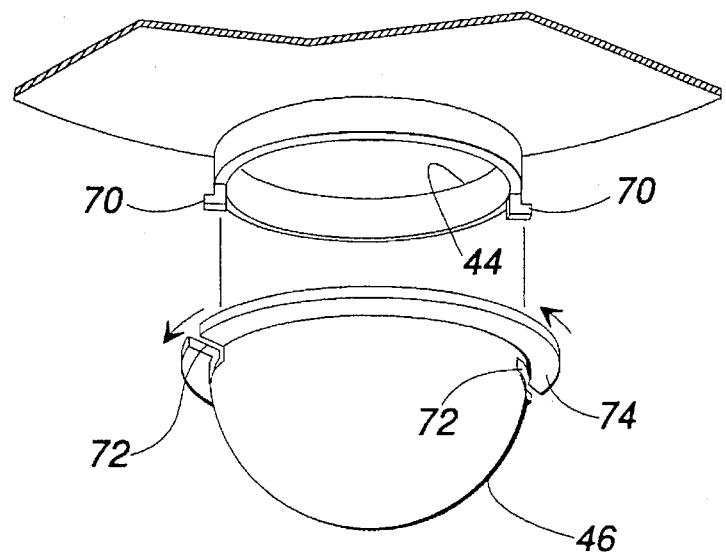
FIG. 3 is a partial exploded perspective view illustrating the attachment for the grease collection cup.

FIG. 3 illustrates the mounting of the grease collection cup 46. Extending downwardly from the opening 44 in the fire box are tabs 70. These tabs engage slots 72 which are formed in the upper rim 74 of the cup 46. A slight twisting motion engages and locks the cup in place, or, alternatively, unlocks and disengages the cup so that it may be emptied.

Figure 4:
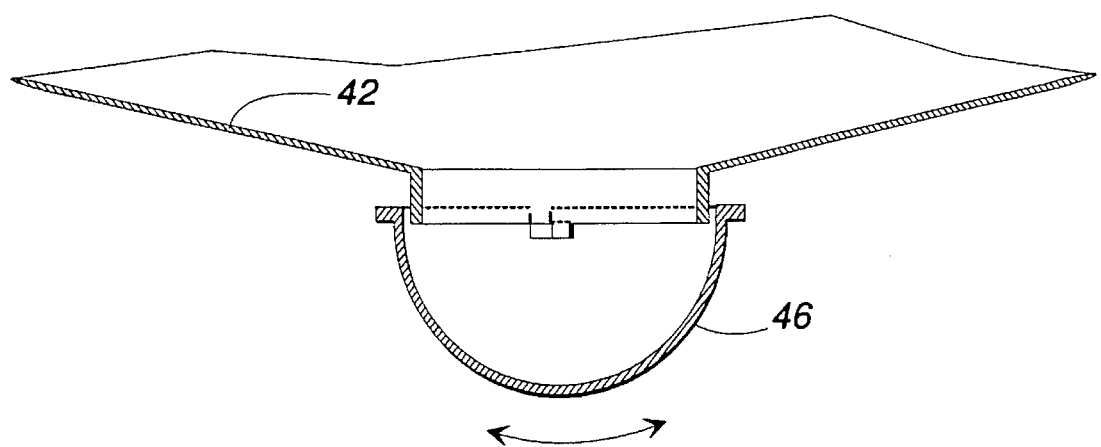
FIG. 4 is a partial cross sectional view illustrating the grease collection cup in its mounted position.

When the cup is engaged, as shown in FIG. 4, the two-point mounting provided by tabs 70 allows the cup to rock back and forth, as indicated by the arrow. This has two advantages over prior art designs. The present cup is self-leveling should the grill itself not be on a level surface. In addition, the cup can be tilted slightly toward the front of the grill so that the user can see the level of fluid inside the cup and know when it needs to be emptied.

Thus, while an embodiment of a barbecue grill and modifications thereof have been shown and described in detail herein, various additional changes and modifications may be made without departing from the scope of the present invention.

I claim:

1. A barbecue grill assembly comprising a fire box with a burner element disposed therein, a cooking grate for receiving food items to be cooked thereon disposed in said fire box above said burner element, said fire box including a substantially planar flange portion extending upwardly and outwardly from said cooking grate at an angle between approximately thirty to forty-five degrees, and a hood member hingedly connected to said fire box for selectively covering the fire box.

2. The barbecue grill assembly as set forth in claim 1, wherein said flange portion is located at a periphery of said fire box.

3. The barbecue grill assembly as set forth in claim 1, further comprising a grease collection cup and means for mounting said grease collection cup underneath said fire box so that an aperture in said fire box is aligned with said grease collection cup, said mounting means permitting a tilting of said grease collection cup relative to said fire box.

4. The barbecue grill assembly as set forth in claim 3, wherein said grease collection cup has an upper rim and a pair of slots formed in said upper rim and said mounting means comprises a pair of tabs for being received within said slots.

5. The barbecue grill assembly as set forth in claim 1, further comprising an upstanding tongue located around a periphery of said fire box, and a receiving means located around the lower periphery of said hood member, said receiving means having an outer leg, wherein said upstanding tongue is adapted to be received within said receiving means formed in said hood member.

6. A bottom casting for use in a barbecue grill, to support a cooking grate above a burner element, comprising:

means for mounting the cooking grate to said bottom casting above the burner element;

said bottom casting having an outer periphery with a substantially planar flange portion extending downwardly and inwardly toward said cooking grate, said flange portion being angled so that said periphery of said bottom casting is further away from said burner element than said cooking grate;

whereby said flange portion directs grease produced during operation of said barbecue grill back down into said bottom casting.

7. The bottom casting as set forth in claim 6, wherein said flange portion extends at an angle between approximately thirty degrees to forty-five degrees.

8. The bottom casting as set forth in claim 6, further comprising an upstanding tongue located at said periphery of said bottom casting, said tongue for being received within a groove formed in a hood of said barbecue grill.

9. The bottom casting as set forth in claim 6, further comprising means for mounting a grease collection cup underneath said bottom casting, said means for mounting said grease collection cup including a pair of tabs for being received within a pair of slots in said grease collection cup.

\* \* \* \* \*